US009433008B2

(12) United States Patent
Werner et al.

(10) Patent No.: US 9,433,008 B2
(45) Date of Patent: Aug. 30, 2016

(54) METHODS AND APPARATUS FOR CHANNEL SELECTION IN A WIRELESS LOCAL AREA NETWORK

(71) Applicant: QUALCOMM Incorporated, San Diego, CA (US)

(72) Inventors: Marc Walter Werner, Heroldsberg (DE); Andrea Garavaglia, Nuremberg (DE); Patrick Stupar, Nuremberg (DE); Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/275,714

(22) Filed: May 12, 2014

(65) Prior Publication Data

US 2015/0327282 A1    Nov. 12, 2015

(51) Int. Cl.
*H04W 72/08* (2009.01)
*H04W 72/04* (2009.01)
*H04W 84/12* (2009.01)

(52) U.S. Cl.
CPC ....... *H04W 72/085* (2013.01); *H04W 72/0453* (2013.01); *H04W 84/12* (2013.01)

(58) Field of Classification Search
CPC ......... H04W 72/085; H04W 72/0453; H04W 84/12
See application file for complete search history.

(56) References Cited

U.S. PATENT DOCUMENTS

| 2002/0188723 A1 | 12/2002 | Choi et al. |
| 2003/0119527 A1* | 6/2003 | Labun ................ H04L 12/5692 455/456.1 |
| 2004/0037247 A1 | 2/2004 | Ngo |
| 2005/0153667 A1* | 7/2005 | Cave ..................... H04W 16/10 455/90.3 |
| 2006/0029023 A1 | 2/2006 | Cervello et al. |
| 2007/0201416 A1 | 8/2007 | Malik |
| 2007/0265001 A1* | 11/2007 | Dias .................. H04W 36/0083 455/435.1 |
| 2008/0159210 A1 | 7/2008 | Zaks et al. |
| 2008/0279146 A1 | 11/2008 | Cave et al. |
| 2009/0003242 A1* | 1/2009 | Tinnakornsrisuphap H04W 40/36 370/255 |
| 2012/0058763 A1* | 3/2012 | Zhao ..................... H04W 48/20 455/434 |
| 2013/0029606 A1 | 1/2013 | Wang et al. |
| 2013/0336140 A1 | 12/2013 | Ma |

OTHER PUBLICATIONS

International Search Report and Written Opinion—PCT/US2015/029952—ISA/EPO—Nov. 3, 2015. (29 total pages).

\* cited by examiner

*Primary Examiner* — William Nealon
(74) *Attorney, Agent, or Firm* — Arent Fox LLP

(57) ABSTRACT

In an aspect, methods and apparatus of communication include detecting a channel reselection condition for triggering reselection from a current channel to a first potential channel. The methods and apparatus further include determining that a first timer value meets or exceeds a first timer threshold value based at least in part on detecting the channel reselection condition. Additionally, the methods and apparatus include selecting the first potential channel from a channel list when the first timer value meets or exceeds the first timer threshold value. In another aspect, methods and apparatus include detecting an initial channel selection condition for triggering selection of a first initial channel. The methods and apparatus further include forming a channel list including one or more channels based on one or more channel selection parameters. Additionally, the methods and apparatus include selecting the first initial channel from the channel list.

26 Claims, 12 Drawing Sheets

METHODS AND APPARATUS FOR CHANNEL SELECTION IN A WIRELESS LOCAL AREA NETWORK

BACKGROUND

The following description relates generally to communication systems, and more particularly to selecting a communications channel at an access point.

Wireless communication networks are widely deployed to provide various communication services such as voice, video, packet data, messaging, broadcast, etc. An example of such wireless communication networks may include a wireless local area network (WLAN). In some wireless communication networks, an access terminal may select and maintain a connection with an access point providing communication capabilities for the access terminal. Further, in such wireless communication systems, multiple access points may be deployed to improve wireless network communications coverage.

In such wireless communication networks, inefficient utilization of available communication resources, particularly failing to identify an optimal communication channel, may lead to degradations in communication. Even more, the foregoing inefficient resource utilization inhibits access terminal from achieving higher wireless communication quality. In view of the foregoing, it may be understood that there may be significant problems and shortcomings associated with current access point configurations. Thus, improvements in access point channel selection are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of communication includes detecting, at an access point, a channel reselection condition for triggering reselection from a current channel to a first potential channel. The method further includes determining that a first timer value meets or exceeds a first timer threshold value based at least in part on detecting the channel reselection condition. Moreover, the method includes selecting the first potential channel from a channel list when the first timer value meets or exceeds the first timer threshold value.

In another aspect, a computer program product comprising a computer-readable medium includes at least one instruction executable to cause a computer to detect, at an access point, a channel reselection condition for triggering reselection from a current channel to a first potential channel. The computer-readable medium further includes at least one instruction executable to cause a computer to determine that a first timer value meets or exceeds a first timer threshold value based at least in part on detecting the channel reselection condition. Moreover, the computer-readable medium includes at least one instruction executable to cause a computer to select the first potential channel from a channel list when the first timer value meets or exceeds the first timer threshold value.

In a further aspect, an apparatus for communication includes means for detecting, at an access point, a channel reselection condition for triggering reselection from a current channel to a first potential channel. The apparatus further includes means for determining that a first timer value meets or exceeds a first timer threshold value based at least in part on detecting the channel reselection condition. Moreover, the apparatus includes means for selecting the first potential channel from a channel list when the first timer value meets or exceeds the first timer threshold value.

In yet another aspect, an apparatus for communication includes a memory storing executable instructions a processor in communication with the memory, wherein the processor is configured to execute the instructions to detect, at an access point, a channel reselection condition for triggering reselection from a current channel to a first potential channel. The processor is further configured to execute the instructions to determine that a first timer value meets or exceeds a first timer threshold value based at least in part on detecting the channel reselection condition. Moreover, the processor is further configured to execute the instructions to select the first potential channel from a channel list when the first timer value meets or exceeds the first timer threshold value.

In an aspect, a method of communication includes detecting, at an access point, an initial channel selection condition for triggering selection of a first initial channel. The method further includes forming a channel list including one or more channels based on one or more channel selection parameters. Moreover, the method includes selecting the first initial channel from the channel list.

In another aspect, a computer program product comprising a computer-readable medium includes at least one instruction executable to cause a computer to detect, at an access point, an initial channel selection condition for triggering selection of a first initial channel. The computer-readable medium further includes at least one instruction executable to at least one instruction executable to cause a computer to form a channel list including one or more channels based on one or more channel selection parameters. Moreover, the computer-readable medium includes at least one instruction executable to at least one instruction executable to cause a computer to select the first initial channel from the channel list.

In a further aspect, an apparatus for communication includes means for detecting, at an access point, an initial channel selection condition for triggering selection of a first initial channel. The apparatus further includes means for forming a channel list including one or more channels based on one or more channel selection parameters. Moreover, the apparatus includes means for selecting the first initial channel from the channel list.

In yet another aspect, an apparatus for communication comprising a memory storing executable instructions and a processor in communication with the memory, wherein the processor is configured to execute the instructions to detect, at an access point, an initial channel selection condition for triggering selection of a first initial channel. The processor is further configured to execute the instructions to form a channel list including one or more channels based on one or more channel selection parameters. Moreover, the processor is further configured to execute the instructions to select the first initial channel from the channel list.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
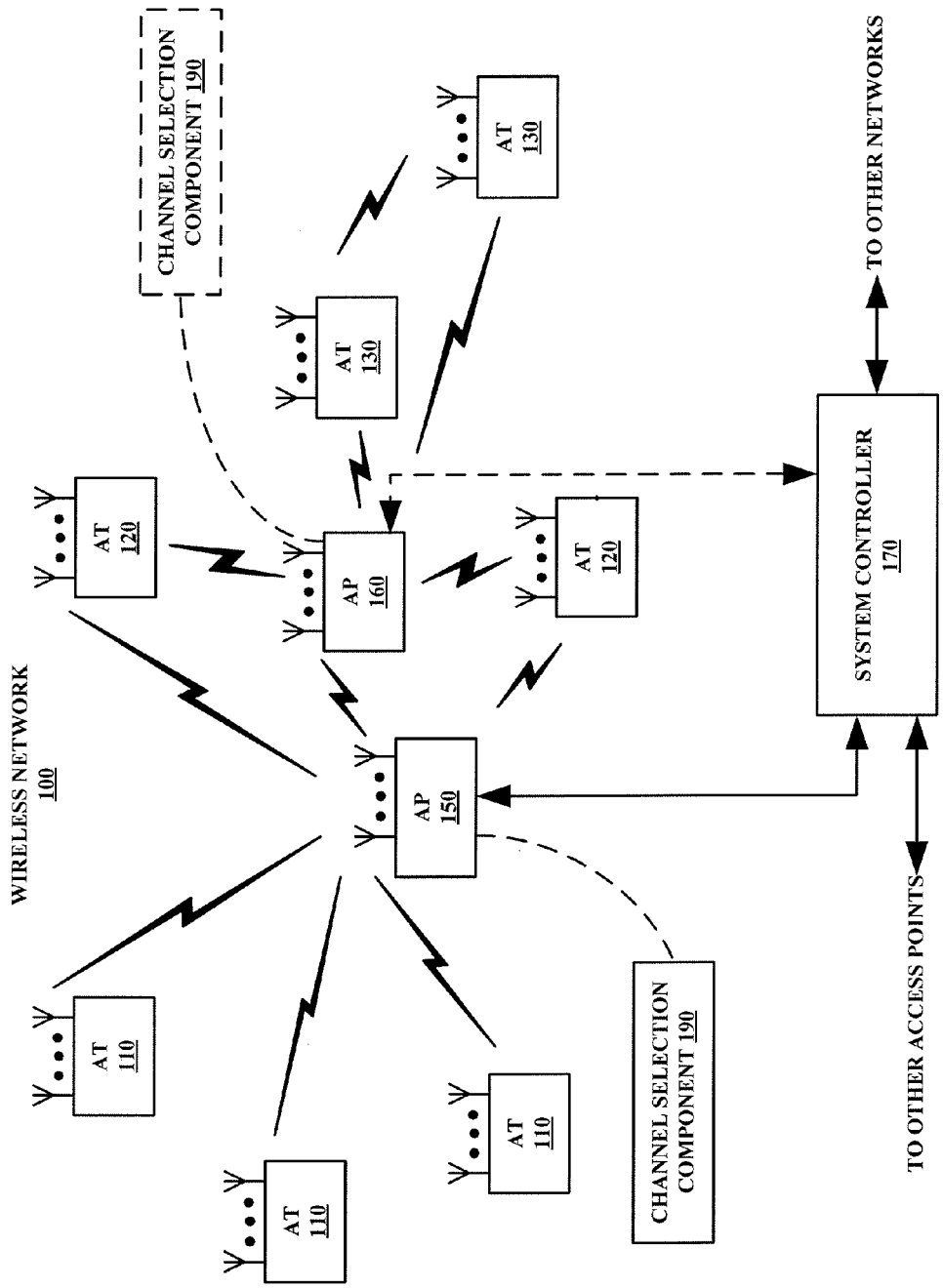
FIG. 1 is a block diagram of a wireless communications network including an access point configured to communicate according to the channel selection component.

The following presents a simplified summary of one or more aspects in order to provide a basic understanding of such aspects. This summary is not an extensive overview of all contemplated aspects, and is intended to neither identify key or critical elements of all aspects not delineate the scope of any or all aspects. Its sole purpose is to present some concepts of one or more aspects in a simplified form as a prelude to the more detailed description that is presented later.

The present aspects generally relate to dynamic channel selection by an access point. Specifically, in some wireless communication systems, an access point may select at least one communication channel upon powering up. The selection may be based on configuration settings, on measurements (e.g., total received power), or on concurrent access point count on each channel. However, the selected channel may experience performance degradations over time due to a variety of factors. Nonetheless, the access point may not be able to select another channel when such performance degradations are experienced. As such, the communication quality between the access point and access terminals may be hampered due to the inability for the access point to select another channel demonstrating higher communication quality.

The present methods and apparatus may provide an efficient and effective solution, as compared to current solutions, to select and/or reselect an optimal or suitable channel for enhanced communication. Specifically, the present methods and apparatus may enable an access point to trigger channel reselection when the access point communication quality meets or is less than a reactive threshold level value, or when communication on or using a different channel would meet or exceed a proactive threshold level value. As such, the present methods and apparatus may enable an access point to dynamically monitor both the current channel on which the access point is communicating and other available channels so as to determine an optimal channel on which to facilitate communication with one or more access terminals. Additionally, the present methods and apparatus may rank channels based on one or more measurements and/or communication criteria for selection purposes. In other aspects, the present methods and apparatus may prevent frequent channel switching (e.g., hysteresis) by employing a timer.

The present methods and apparatus may generally describe an architecture, as well as high-level schemes, for dynamic channel selection (DCS) in access points. The architecture may be based on three general components: (1) a reselection trigger, (2) a utility table, and (3) a channel switch operation. The reselection trigger may involve measurements of the current transmission quality, which may be evaluated and combined into an effective trigger metric. Whenever the transmission quality is less than a certain threshold, a channel reselection procedure may be initiated (e.g., reactive reselection). The measurements used for the trigger may be available in the access point from other functional blocks (e.g., such as acknowledgment (ACK)/ negative acknowledgment (NACK) count), they may be dedicated local measurements (e.g. noise floor on active channel), or they may be pushed or pulled from other network entities (e.g. channel use statistics from other access points or a centralized database).

Regarding the utility table, the access point may maintain a list of available channels and a utility value for each channel. The utility value may represent a dedicated metric of combined measurements that may predict the expected performance on each channel. Measurements may be made repeatedly (e.g., periodically) to update the utility table. These measurements need not be as extensive as those for the reselection trigger because the utility value may be used to provide a coarse performance estimation, and also because extensive measurements on all channels may result in significant overhead. When a reactive reselection is triggered, the target channel may be selected according to maximum utility value (some additional constraints such as hysteresis may also apply). When, for example, the current operating channel exhibits a significantly worse utility value than other channels, a proactive channel reselection may be triggered even if the current transmission performance is still generally satisfactory.

Regarding the channel switch execution, in a dynamic channel selection scheme, stability may need to be ensured or guaranteed to some extent. Therefore, the channel switch execution may employ several mechanisms that may avoid frequent reselection events. For example, the channel switch execution may evaluate the history of channel use by the access point. When a particular channel with a high utility value has been used regularly or often (or has been in use recently), a switch to this channel may be rejected. In such a case, a next channel in the utility table may be selected instead. Moreover, an overall timer may be employed that may limit the maximum channel reselection frequency of the access point. With respect to the utility value itself, a minimum offset may be defined that may be used to reject a channel switch when the utility difference is too small.

The measurements performed in connection with dynamic channel selection may include periodic or repeated access point measurements including channel-related and interference-related measurements. For example, the measurements may include interference level (e.g., received signal strength indicator (RSSI), noise floor), downlink (DL)/uplink (UL) signal-to-interference-plus-noise ratio (SINR) and capacity, number of co-channel access points in a range, number of adjacent channel access points in a range, channel free time, rate of physical layer (PHY) error. The measurements performed in connection with dynamic channel selection may also include association measurements such as number of stations (STAs) currently associated with an access point. The measurements performed in connection with dynamic channel selection may also include DL/UL traffic measurements at the access point such as DL/UL retransmission probabilities (e.g., packet-error-rate (PER), NACKs, ACKs received/issued, DL load and traffic classes/QoS queues, DL throughput vs. offered load, DL/UL rate distributions. The measurements performed in connection with dynamic channel selection may also include measurements such as interference duty cycle/spectral scan, 802.11k measurement reports from stations as well a beacon requests/reports.

Several aspects of a wireless network will now be presented with reference to FIG. 1. The wireless network 100 is shown with several wireless nodes, generally designated as Access Points (AP) 150 and 160 and access terminals (AT) 110, 120, and 130. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications.

However, those skilled in the art will readily understand that other terminology or nomenclature may be used for an access point and/or an access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for any number of access terminals 110, 120, and/or 130. A system controller 170 may be used to provide coordination and control of the access points, as well as access to other networks (e.g., Internet) for access terminals 110, 120, and/or 130. For simplicity, two access points 150 and 160 are shown in FIG. 1. In an aspect, access points 150 and 160 may include channel selection component 190, which may be configured to select and/or reselect to an optimal channel for facilitating communication with one or more access terminals 110, 120, and/or 130, based on one or more measurement values and/or utility criteria.

The channel selection component 190 may be configured to perform dynamic channel selection or DCS as described herein. In the aspects of FIG. 1, access point 160 may optionally include channel selection component 190. In such aspects, access point 160 may experience throughput gains even when not having channel selection component 190 as at least one neighboring access point (e.g., access point 150) may select a different channel that may result in reduced interference with surrounding access points. Additionally, access point 160 may optionally be connected to, or otherwise in communication with, system controller 170.

For example, in an aspect, an access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

In an aspect, the wireless network 100 may support MIMO technology. Using MIMO technology, access points 150 and/or 160 may communicate with multiple access terminals 110, 120, and/or 130 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enable each access terminal 110, 120, and/or 130 to recover the data stream destined for that access terminal. On the uplink, each access terminal 110, 120, and/or 130 transmits a spatially precoded data stream, which enables the access point 150 and/or 160 to identify the source of each spatially precoded data stream.

One or more access terminals 110, 120, and/or 130 may be equipped with multiple antennas to enable certain functionality. With this configuration, multiple antennas at access point 150 and/or 160 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

Figure 2:
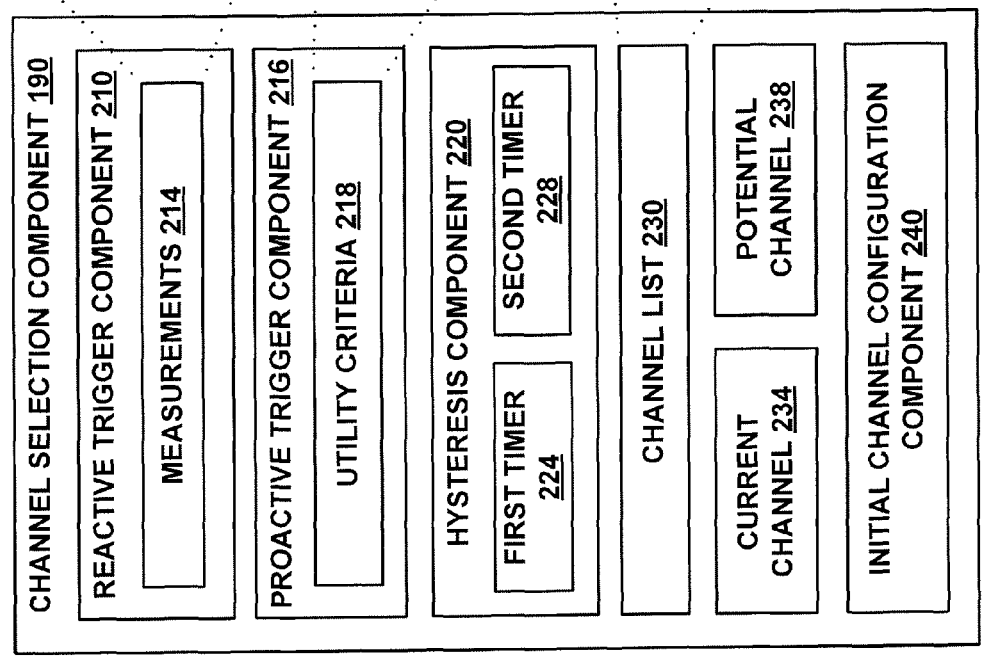
FIG. 2 is a schematic diagram of an aspect of the channel selection component of FIG. 1.

Referring to FIG. 2, in an aspect, channel selection component 190 may include various components and/or subcomponents, which may be configured to select and/or reselect to an optimal channel for enhanced communication with one or more access terminals. For example, channel selection component 190 may enable an access point 150/160 (FIG. 1) to select and/or reselect to an optimal or most suitable available channel based on one or both of a reactive triggering mechanism according to the reactive trigger component 210 and a proactive triggering mechanism according to the proactive trigger component 216.

Channel selection component 190 may enable or otherwise configure an access point to monitor one or both of the current channel on which the access point is current communicating on and other channels on which the access point is not communicating on, yet nonetheless may be available for communication. That is, channel selection component 190 may enable or otherwise configure the access point to continuously determine whether a trigger is detected for a channel switch based on one or both of a degradation in communication quality of the current channel 234 or detection of a potential channel 238 exhibiting higher communication quality or characteristics. As such, channel selection component 190 may ensure that access point communicates on the most optimal channel available for communication.

In such aspects, channel selection component 190 may be configured to enable an access point to communicate or otherwise operate on the optimal or most suitable available channel in a dynamic WLAN environment. Specifically, channel selection component 190 may include reactive trigger component 210, which may be configured to trigger a channel switch or reselection procedure from a current channel 234 to a potential channel 238 upon detecting or otherwise determining degradations in communication quality of the current channel 234. For example, reactive trigger component 210 may be configured to determine whether a current channel quality value meets or is less than a first threshold value. It should be understood that the term "meet" in the context of threshold comparisons may also be synonymous with the term "equal". That is, in an example, reactive trigger component 210 may be configured to determine whether a current channel quality value is less than or equal to a first threshold value.

In some aspects, the current channel quality value may correspond to or otherwise be associated with the current channel 234 on which the access point is current communicating. For instance, reactive trigger component 210 may be configured to make such determination based at least in part on one or more measurements 214. In particular, reactive trigger component 210 may be configured to receive or otherwise obtain a load level value, a traffic class indication, a quality of service (QoS) value, a received power indicator, a throughput value, an offered load value, a retransmission probability value, a channel busy time value, an interference level value, a spectral scan measurement value, an 802.11k measurement value, and the channel list. In other aspects, the one or more measurements may include channel list 230.

As such, one or both of the current channel quality value and the first quality threshold value may be based at least in part on the one or more measurements 214. For example, in a non-limiting aspect, the current channel quality value associated with current channel 234 may be a value indicative of a channel quality of the current channel 234 based on an aggregation of one or more values corresponding to the one or more measurements 214. Additionally, in some aspects, each of the one or more measurement 214 (e.g., which may take or be represented as a value) may be assigned a weight in the determination of the current channel quality value. For instance, a throughput value may be assigned a higher weight than a channel busy time in the determination of the current channel quality value.

In addition, the one or more measurements may include one or more downlink traffic measurements, one or more uplink traffic measurements, and one or more channel-related or specific measurements. In other aspects, the one or more measurements may also include access point context information, system wide channel assignment and load balance information.

Additionally, channel selection component 190 may include proactive trigger component 216, which may be configured to trigger a channel switch or reselection procedure from a current channel 234 to a potential channel 238. For example, proactive trigger component 216 may be configured to detect or otherwise determine that a channel exhibiting higher communication quality may be available. Specifically, proactive trigger component 216 may be configured to determine whether a potential channel quality gain value associated with the potential channel 238 meets or exceeds a second quality threshold value. In such aspects, the potential channel quality gain value may be a value representing the difference and/or gain between the current channel 234 and the potential channel 238.

The potential channel quality gain value may correspond to at least one other channel (e.g., potential channel 238) potentially demonstrating a higher communication quality level than the current channel 234 on which the access point is current communicating on. In some aspects, one or both of the potential channel quality gain value and the second quality threshold value are determined based at least in part on utility criteria 218. Additionally, proactive trigger component 216 may be configured to periodically or repeatedly determine or otherwise calculate whether a potential channel 238 exhibits higher communication quality than current channel 234.

In such aspects, to ensure the accuracy or confidence in a channel switch triggering indication, a sufficient value may be chosen or determined as the second quality threshold value. As such, the second quality threshold value may indicate a quality value difference between the current channel 234 and the second threshold value so as to trigger reselection to the potential channel 238. For example, the current channel 234 may exhibit or be indicative of a current channel quality value and the potential channel 238 may exhibit or be indicative of a potential channel quality gain value.

However, in some aspects, it may be desirable to set a value indicative of a difference between the current channel 234 and the second quality threshold value as a sufficiently higher value in order to ensure the accuracy or confidence in a channel switch triggering indication, and to prevent switching from a potential channel 238 exhibiting only slightly better communication quality or characteristic than the current channel 234.

Proactive trigger component 216 may be configured to make a determination as to whether a potential channel quality gain value associated with the potential channel 238 meets or exceeds a second quality threshold value based at least in part on utility criteria 218. In particular, proactive trigger component 216 may be configured to receive or otherwise obtain one or more of a received power indicator value, a noise level value, a channel available time value, an effective theoretical capacity value, an interference level value, a spectral scan value, and a 802.11 measurement value (e.g., 802.11k measurement value). In some aspects, the 802.11 measurement value may include, but is not limited to, a signal-to-noise ratio for one or more serving stations on the serving channels.

In further aspects, utility criteria 218 may also include one or more of access point channel distribution information, access point position information, path loss information, channel switching range and external load measurements. Additionally, proactive trigger component 216 may be configured to determine the effective theoretical capacity value as a function of one or more of a downlink power value, a number of access points, a number of access points communicating on the current channel. In such aspects, the effective theoretical capacity may indicate a maximum downlink capacity at the access point.

In some aspects, the determinations made at one or both of reactive trigger component 210 and/or proactive trigger component 216 may satisfy a channel reselection condition. That is, channel selection component 190 may be configured to detect a channel reselection condition for triggering reselection from a current channel 234 to a potential channel 238 based at least in part on a determination at one or both of reactive trigger component 210 and proactive trigger component 216.

The utility criteria 218 may also include at least one of the one or more measurements 214. That is, reactive trigger component 210 may be configured to communicate the one or more measurements 214 to proactive trigger component 216. Likewise, in other aspects, proactive trigger component 216 may be configured to communicate utility criteria 218 to reactive trigger component 210. Accordingly, in some aspects, the one or more measurements 214 and the utility criteria 218 may be stored within a local database or storage at an access point. As such, one or both of reactive trigger component 210 and proactive trigger component 216 may be configured to access the local database or storage in order to consider one or more of the stored measurements 214 and/or utility criteria 218 in forming a triggering determination.

Further, one or both of reactive trigger component 210 and proactive trigger component 216 may be configured or otherwise triggered to receive and store the one or more measurements 214, respectively, based on one or more of powering of the access point (e.g., for a first time), an event-defined (e.g., after every channel selection and/or reselection), and/or on a periodic basis.

Additionally, channel selection component 190 may include channel list 230, which may be configured to store a list of one or more channels including the current channel 234. For example, the channel list 230 may include one or more channels ranked according to the utility criteria 218. Additionally, the potential channel 238 may correspond to a most suitable available channel in the channel list. In such aspects, an available channel may be a channel not already in use, such as current channel 234, or a channel previously indicated by hysteresis component 220 as unavailable. Further, the channels may be ranked or sorted according to a utility value determined by proactive trigger component 216 and corresponding to the utility criteria 218. As such, a utility value may be a value indicative of the communication quality for a respective channel.

For example, as illustrated in FIG. 2, channel list 230 may include one or more channels sorted or ranked according to their respective utility values. In such aspects, access point may be communicating according to or on Channel 8, having a utility value of $U_8$. However, Channel 5 includes a utility value $U_5$ ranked higher than Channel 8. Accordingly, if the channel quality value of Channel 5 (e.g., potential channel quality gain value) as indicated by its utility value meets or exceeds the second quality threshold value, a channel switch triggering indication may be triggered. As such, channel list 230, which may be formed based on the utility criteria 218, may be used or otherwise operate as triggering mechanism for the proactive trigger component 216. Channel list 230 may also include the access point's channel use history and the service set identifier (SSID) and/or the basic service set identifier (BSSID) of each access point in the channel list.

Channel selection component 190 may be configured to send a channel switch triggering indication to hysteresis component 220 upon detecting a channel reselection condition for triggering reselection from current channel 234 to potential channel 238. In some aspects, the channel switch triggering indication may include one or more potential channels from the channel list 230. As such, channel selection component 190 may include hysteresis component 220, which may be configured to prevent frequent switching from a current channel 234 to a potential channel 238, as well as prevent frequent switching between potential channels.

In an aspect, hysteresis component 220 may be configured to prevent constant or frequent switching from a current channel 234 to a potential channel 238. For example, hysteresis component 220 may be configured to determine whether a first timer value 224 meets or exceeds a first timer threshold value. In some aspects, the first timer value indicates a time duration value between a selection of the current channel 234 by the access point and the detection of the channel reselection condition (e.g., channel switch triggering indication).

In another aspect, hysteresis component 220 may be configured to prevent constant or frequent switching between potential channels. That is, hysteresis component 220 may be configured to prevent frequent switching from or to a same potential channel. For example, referring to channel list 230, hysteresis component 220 may be configured to prevent a channel switch to Channel 5 if a second timer value 228 associated with Channel 5 does not meets or exceed a second timer threshold value. As such, the second timer value 228 may indicate or include a time duration value between a previous selection of the potential channel 238 by the access point and a current selection of the potential channel 238. In such aspects, Channel 5 may be referred to as the potential channel 238.

Channel selection component 190 may also include initial channel configuration component 240, which may be configured to initially configure a selection of a channel at an access point. Specifically, referring to FIG. 3, in an aspect, initial channel configuration component 240 may include various components and/or subcomponents, which may be configured to select and/or reselect to an optimal channel for enhanced communication with one or more access terminals. For example, initial channel configuration component 240 may be configured to detect an initial channel selection condition 310 for triggering selection of an initial channel 320. In some aspects, the initial channel selection condition 310 may include one or both of a reset of the access point and an initial powering of the access point.

Further, initial channel configuration component 240 may be configured to form a channel list 230 including one or more channel selection parameters, for example, based on detecting the initial channel selection condition 310. That is, upon detection of the initial channel selection condition 310, initial channel configuration component 240 may be configured to form channel list 230 based on one or more channel selection parameters 330. In such aspects, initial channel configuration component 240 may be configured to receive or otherwise obtain one or more measurements 214 and utility criteria 218 from reactive trigger component 210 and proactive trigger component 216, respectively, upon or before detecting the initial channel selection condition 310.

As such, channel selection parameters 330 may include one or more of one or more measurements 214 and utility criteria 218. Further, the channel selection parameters 330 may include one or more of a last used channel, a cleanest channel, a lowest loaded channel, a channel having a highest utility value, a randomly selected channel, and a default channel. In such aspects, the channel list 230 may be formed to populate the list with one or more channels previously stored at the access point prior to detection of the initial channel selection condition 310 and channels detected following detection of the initial channel selection condition 310.

Moreover, initial channel configuration component 240 may be configured to select the initial channel 320 from the channel list 230. As such, during the initial channel selection, access point via initial channel quality evaluation component 340, may be configured to select to an optimal channel based on one or more channel selection parameters 330. Additionally, upon selection of an initial channel 320, initial channel configuration component 240 may be configured to evaluate the quality of the initial channel 320.

For example, initial channel configuration component 240 may include initial channel quality evaluation component 340, which may be configured to receive one or more measurements associated with the initial channel 320 based on performing one or both of a spectral scan and a channel scan. In some aspects, the one or more measurements may be used to determine an initial channel quality value. Initial channel quality evaluation component 340 may be configured to determine whether the initial channel quality value meets or exceeds an initial channel quality threshold value.

In other words, the selected channel (e.g., initial channel 320) may be evaluated to determine whether it fulfills a minimal quality level. As such, initial channel configuration component 240 may be configured to select another initial channel from the channel list 230 when the initial channel quality value does not meet or exceed an initial channel quality threshold value. As such, initial channel quality evaluation component 340 may be configured to continuously evaluate the initial channel until a suitable initial channel 320 is selected.

However, if all available channels are exhausted during the evaluation, and no suitable channels are determined, then initial channel configuration component 240 may be configured to select to most optimum of the unsuitable channels. Additionally, in some aspects, the one or more channel selection parameters 330 may be stored at the access point prior to detecting the initial channel selection condition 310.

Figure 4:
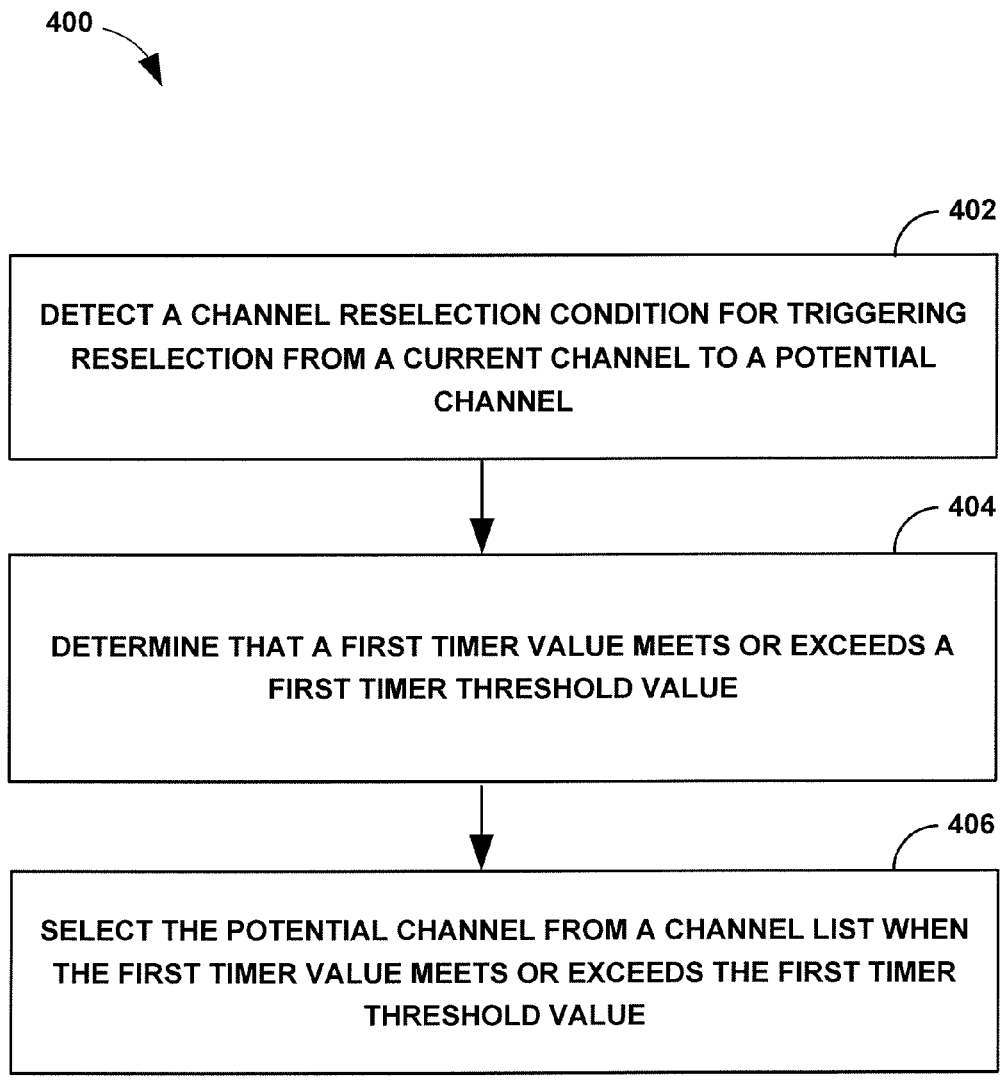
FIG. 4 is a flowchart of an aspect of a method of communication in accordance with an aspect of the present disclosure, e.g., according to FIG. 2.
Figure 5:
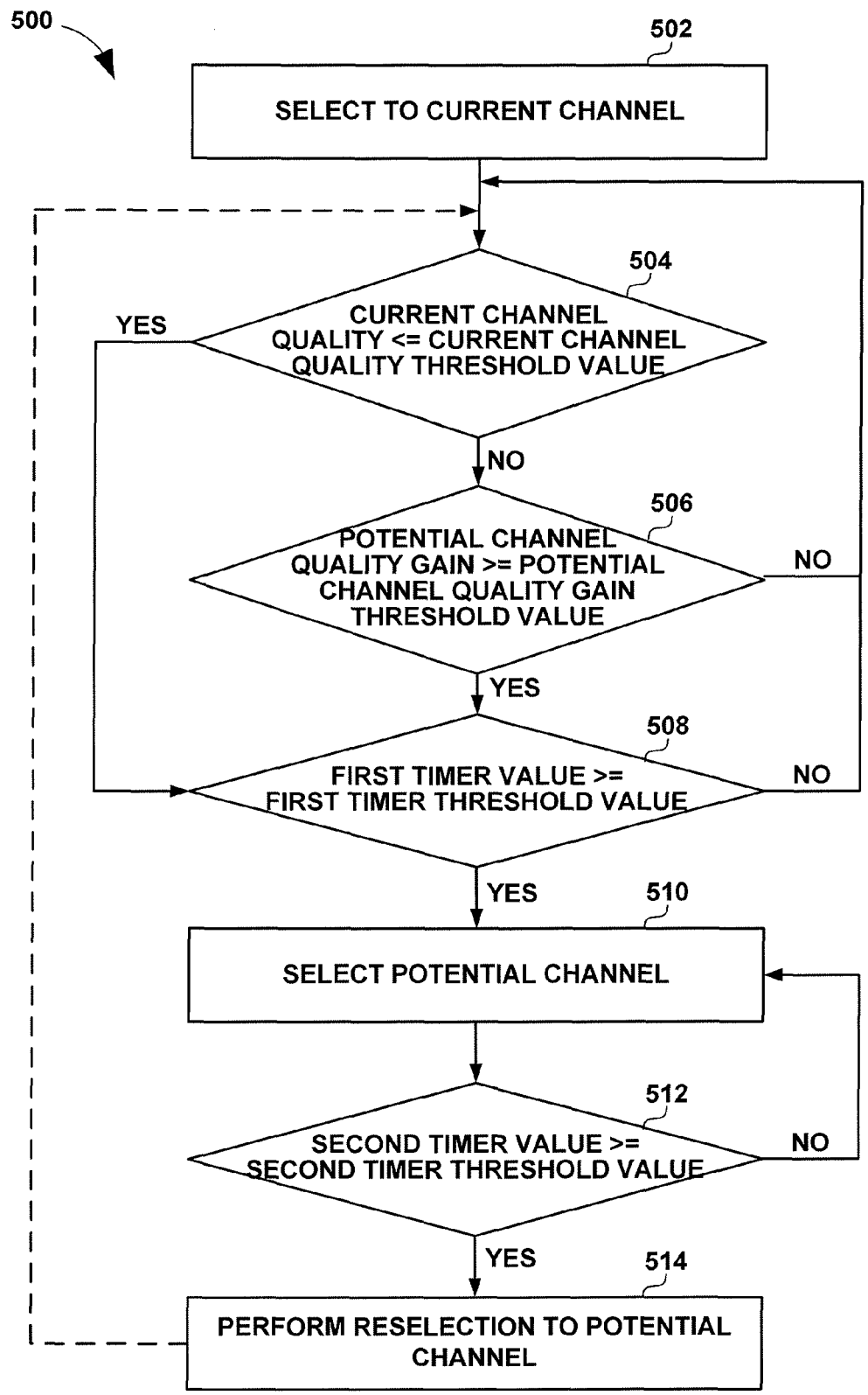
FIG. 5 is a flowchart of another aspect of a method of communication in accordance with an aspect of the present disclosure, e.g., according to FIG. 2.
Figure 6:
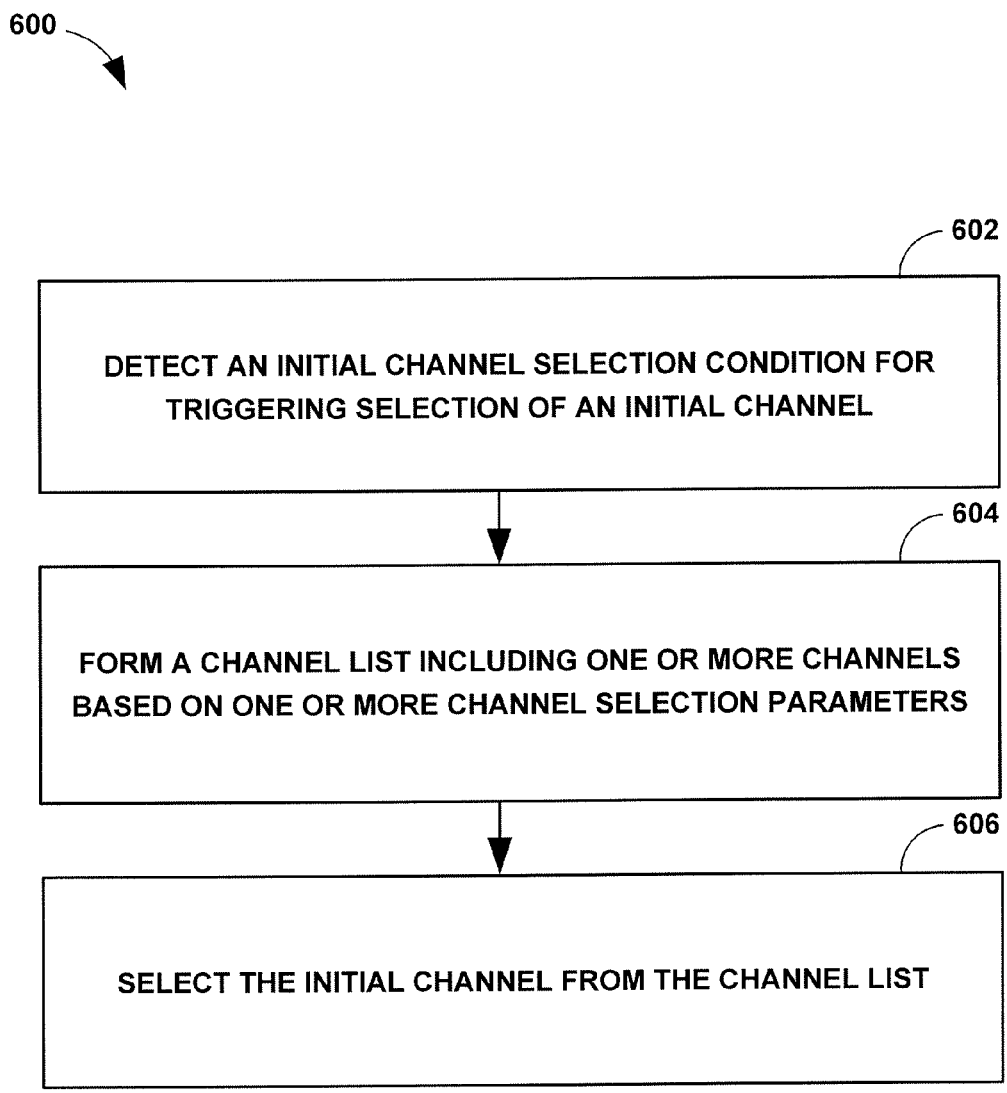
FIG. 6 is a flowchart of an aspect of a method of communication in accordance with an aspect of the present disclosure, e.g., according to FIG. 5.

Referring to FIGS. 4-6, the methods are shown and described as a series of acts for purposes of simplicity of explanation. However, it is to be understood and appreciated that the methods (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

Referring to FIG. 4, in an operational aspect, an access point such as access point 150/160 (FIG. 1) may perform one aspect of a method 400 for selecting an optimal channel for facilitating communication with one or more access terminals 110/120/130 (FIG. 1).

In an aspect, at block 402, method 400 may detect a channel reselection condition for triggering reselection from a current channel to a potential channel (the potential channel may be a first of several potential channels). For example, as described herein, channel selection component 190 (FIGS. 1 and 2) may execute one or both of reactive trigger component 210 (FIG. 2) and proactive trigger component 216 (FIG. 2) to detect a channel reselection condition for triggering reselection from a current channel 234 (FIG. 2) to a potential channel 238 (FIG. 2).

Further, at block 404, method 400 may determine that a first time value meets or exceeds a first timer threshold value. For example, as described herein, channel selection component 190 (FIGS. 1 and 2) may execute hysteresis component 220 (FIG. 2) to determine that a first time value 224 meets or exceeds a first timer threshold value, for instance, on detecting the channel selection condition.

At block 406, method 400 may select the potential channel from a channel list when the first timer value meets or exceeds the first timer threshold value. For instance, as described herein, channel selection component 190 (FIGS. 1 and 2) may executed to select the potential channel 238 (FIG. 2) from a channel list 230 (FIG. 2) when the first timer value 224 (FIG. 2) meets or exceeds the first timer threshold value.

Referring to FIG. 5, in an operational aspect, an access point such as access point 150/160 (FIG. 1) may perform one aspect of a method 500 for selecting an optimal channel for facilitating communication with one or more access terminals 110/120/130 (FIG. 1).

Initially, at block 502, method 500 may select to a current channel. For instance, as described herein, channel selection component 190 (FIG. 2) may be executed to select to current channel 234 upon, for example, powering up the access point (e.g., for a first time) or upon reset of the access point. Further, at block 504, method 500 may determine whether a current channel quality value meets or is less than a current channel quality threshold value. For example, as described herein, channel selection component 190 (FIG. 2) may execute reactive trigger component 210 to determine whether a current channel quality value associated with the current channel 234 (FIG. 2) meets or falls below a current channel quality threshold value.

In other words, at block 504, method 500 may determine whether a communication quality associated with the current channel exhibits or demonstrates a sufficient degradation in communication quality in order to trigger selection of a potential channel. As such, method 500 may proceed to block 508 when current channel quality value meets or falls below a current channel quality threshold value. Otherwise, method 500 may proceed to block 506 to determine whether a potential channel exhibits a sufficiently high level of communication quality over the current channel to trigger selection of that potential channel.

Specifically, at block 506, method 500 may determine whether a potential channel quality gain value meets or exceeds a potential channel quality gain threshold value. For example, channel selection component 190 (FIG. 2) may execute proactive trigger component 216 to whether a potential channel quality gain value associated with a potential channel 238 (FIG. 2) in the channel list 230 (FIG. 2) meets or exceeds a potential channel quality gain threshold value. Method 500 may return to block 504 to continue monitoring the quality of the current channel and the potential channels in the channel list.

In some aspects, a positive determination at block 504 or block 506 may satisfy or otherwise indicate a channel reselection condition. Further, it should be understood that method 500 may perform blocks 504 and 506 at the same time or in reverse order such that the determination at block 506 may be performed prior to block 504.

Otherwise, method 500 may proceed to block 508 to determine whether a first timer value meets or exceeds a first timer threshold value. For instance, channel selection component 190 (FIG. 2) may execute hysteresis component 220 to determine whether a first timer value 224 associated with the current channel 234 meets or exceeds a first timer threshold value. In such aspects, method 500 may determine whether a sufficient amount of time has elapsed since the selection of the current channel at block 502 until the detection of the channel reselection condition at block 504 or block 506.

Method 500 may return to block 504 when the first timer value does not meet or exceed a first timer threshold value. That is, if a sufficient amount of time has not elapsed since the selection of the current channel and a detection of the channel reselection condition, method 500 may return to block 504. Otherwise, method 510 may proceed to block 510 to select a potential channel. For instance, as described herein, channel selection component 190 (FIGS. 1 and 2) may executed to select the potential channel 238 (FIG. 2) from a channel list 230 (FIG. 2) when the first timer value 224 (FIG. 2) meets or exceeds the first timer threshold value.

In addition, at block 512, method 500 may determine whether a second timer value meets or exceeds a second timer threshold value. For example, channel selection component 190 (FIG. 2) may execute hysteresis component 220 to determine whether a second timer value 228 (FIG. 2) associated with the potential channel meets or exceeds a second timer threshold value. In such aspects, the second timer value may be indicative of a duration value between a previous selection of the potential channel by the access point and a current selection of the potential channel at block 510.

Method 500 may return to block 510 to select another or a second potential channel from the channel list when the second timer value does not meet or exceed the second timer threshold value. In some aspects, the second potential channel may correspond to a subsequent most suitable available channel in the channel list.

Otherwise, method 500 may proceed to block 514 to perform reselection to the potential channel. For example, the access point may configure its radio resources to communicate on the potential channel at block 514. In addition, upon performing reselection at block 514, the potential channel may be considered or referred to as the new current channel. As such, method 500 may return to block 504 to continue monitoring the new current channel.

Referring to FIG. 6, in an operational aspect, an access point such as access point 150/160 (FIG. 1) may perform one aspect of a method 600 for selecting an initial channel for facilitating communication with one or more access terminals 110/120/130 (FIG. 1).

Figure 3:
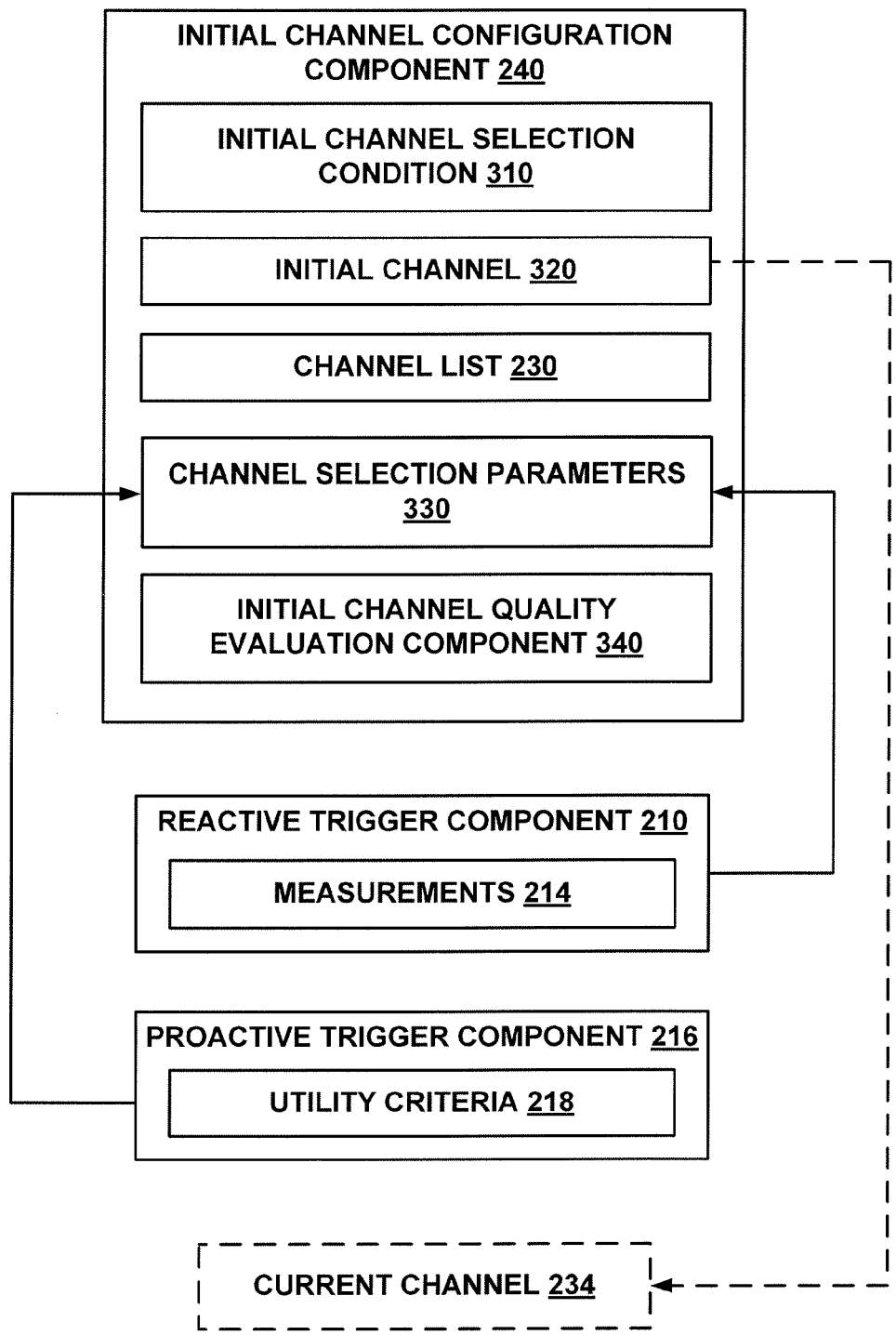
FIG. 3 is a schematic diagram of an aspect of the initial channel configuration component of FIG. 2.

In an aspect, at block 602, method 600 may detect an initial channel selection condition for triggering selection of an initial channel. For example, as described herein, channel selection component 190 (FIGS. 1 and 2) may execute initial channel configuration component 240 (FIGS. 2 and 3) to detect an initial channel selection condition 310 (FIG. 3) for triggering selection of an initial channel 320 (FIG. 3).

Further, at block 604, method 600 may form a channel list including one or more channels based on one or more channel selection parameters. For example, as described herein, channel selection component 190 (FIGS. 1 and 2) may execute initial channel configuration component 240 (FIGS. 2 and 3) to form a channel list 230 (FIGS. 2 and 3) including one or more channels based on one or more channel selection parameters 330 (FIG. 3).

At block 606, method 600 may select the initial channel from the channel list. For example, as described herein, channel selection component 190 (FIGS. 1 and 2) may execute initial channel configuration component 240 (FIGS. 2 and 3) to select the initial channel 320 (FIG. 3) from the channel list 230 (FIGS. 2 and 3).

Figure 7:
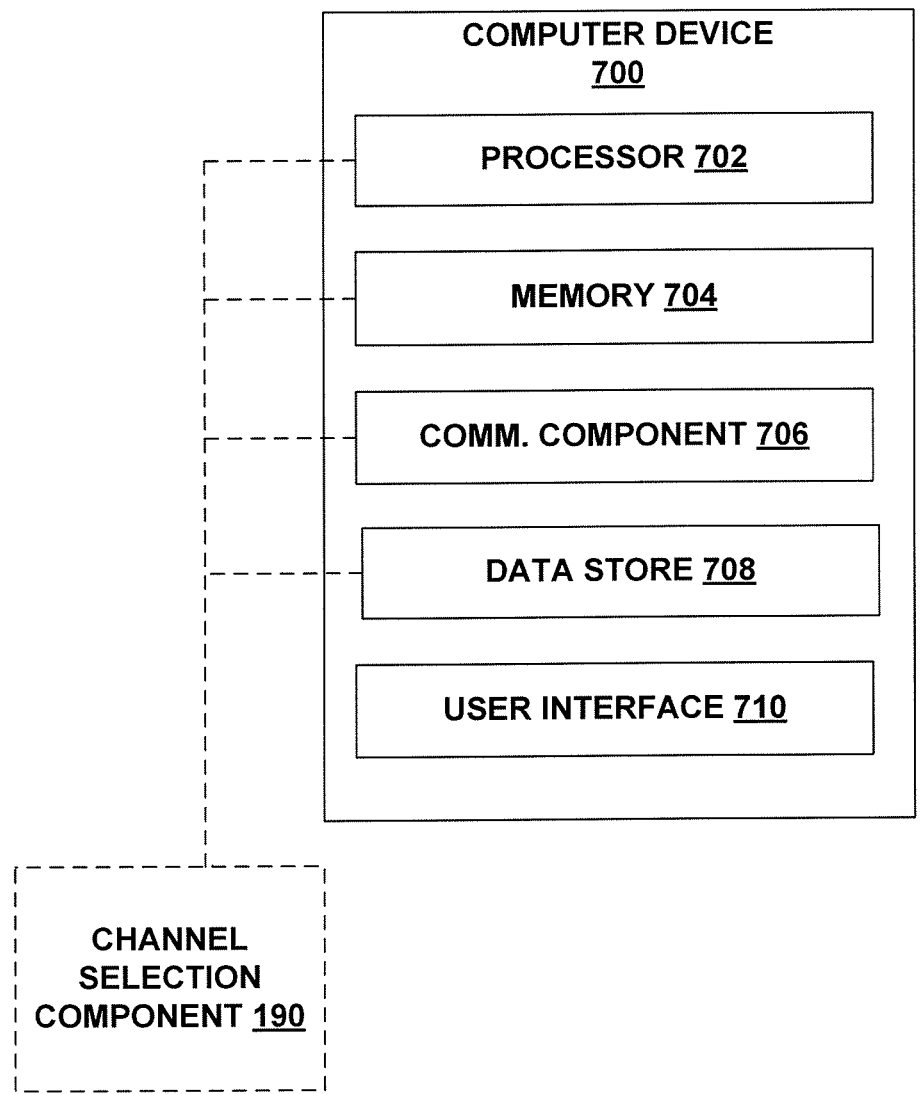
FIG. 7 is a block diagram illustrating aspects of a computer in accordance with an aspect of the present disclosure, e.g., according to FIG. 2.

Referring to FIG. 7, in an aspect, access points 150 and/or 160 may be represented by a specially programmed or configured computer device 700. In one aspect of implementation, computer device 700 may include AP 150/160 and/or channel selection component 190 (FIGS. 1 and 2), such as in specially programmed computer readable instructions or code, firmware, hardware, or some combination thereof. Computer device 700 includes a processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Computer device 700 further includes a memory 704, such as for storing data used herein and/or local versions of applications being executed by processor 702. Memory 704 can include any type of memory usable by a computer, such as random access memory (RAM), read only memory (ROM), tapes, magnetic discs, optical discs, volatile memory, non-volatile memory, and any combination thereof.

Further, computer device 700 includes a communications component (comm. component) 706 that provides for establishing and maintaining communications with one or more parties utilizing hardware, software, and services as described herein. Communications component 706 may carry communications between components on computer device 700, as well as between computer device 700 and external devices, such as devices located across a communications network (e.g., via WLAN) and/or devices serially or locally connected to computer device 700.

For example, communications component 706 may include one or more buses, and may further include transmit chain components and receive chain components associated with a transmitter and receiver, respectively, or a transceiver, operable for interfacing with external devices. In an additional aspect, communications component 706 may be configured to receive one or more pages from one or more subscriber networks. In a further aspect, such a page may correspond to the second subscription and may be received via the first technology type communication services.

Additionally, computer device 700 may further include a data store 708, which can be any suitable combination of hardware and/or software, that provides for mass storage of information, databases, and programs employed in connection with aspects described herein. For example, data store 708 may be a data repository for applications not currently being executed by processor 702 and/or any threshold values or finger position values.

Computer device 700 may additionally include a user interface component 710 operable to receive inputs from a user of computer device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Figure 8:
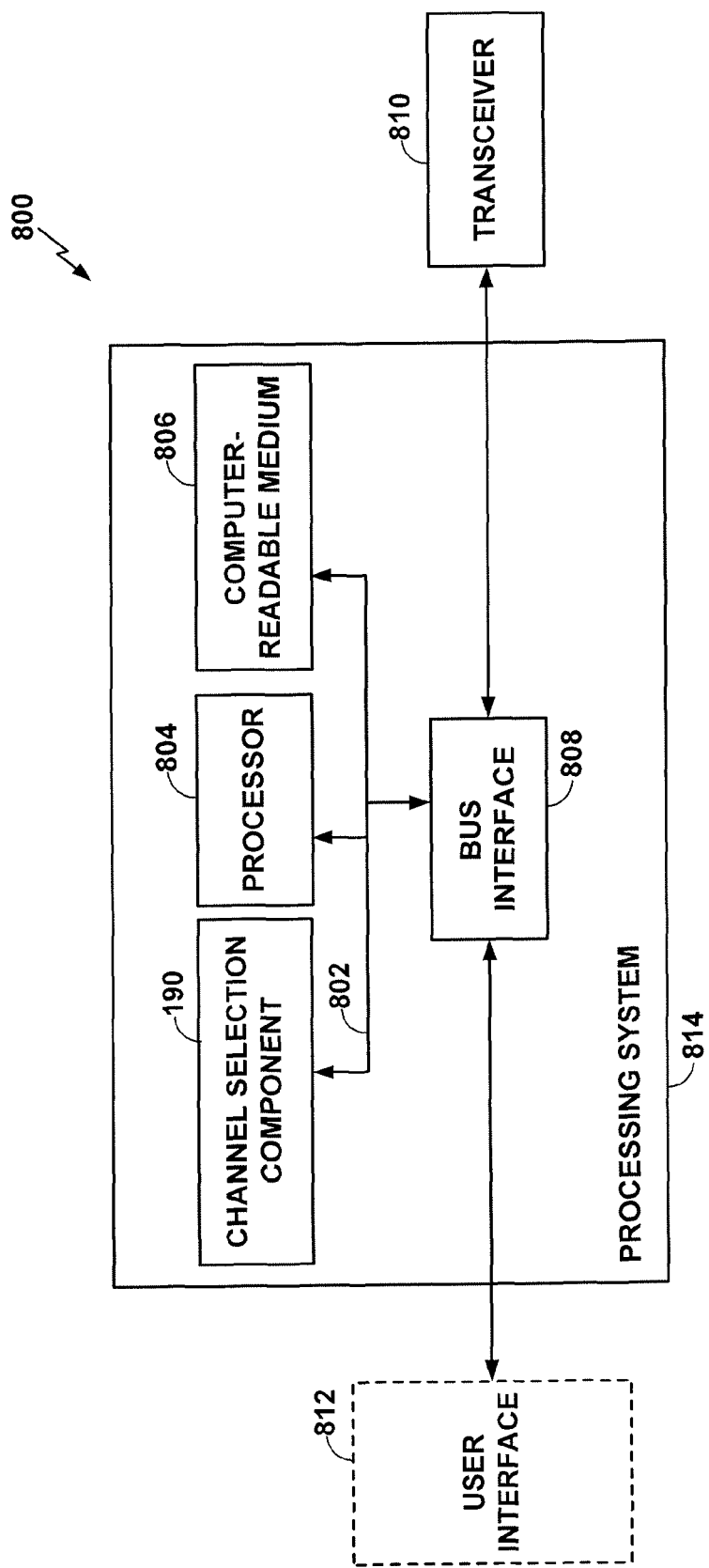
FIG. 8 is a block diagram illustrating an example of a hardware implementation for an apparatus employing a processing system in accordance with an aspect of the present disclosure, e.g., according to FIG. 2.

FIG. 8 is a block diagram illustrating an example of a hardware implementation for an apparatus, including, for example, AP 150/160 and/or channel selection component 190 (FIGS. 1 and 2), employing a processing system 814 for carrying out aspects of the present disclosure, such as method for dynamic channel selection using one or both of reactive and proactive reselection mechanisms. In this example, the processing system 814 may be implemented with bus architecture, represented generally by a bus 802. The bus 802 may include any number of interconnecting buses and bridges depending on the specific application of the processing system 814 and the overall design constraints.

The bus 802 links together various circuits including one or more processors, represented generally by the processor 804, computer-readable media, represented generally by the computer-readable medium 806, and one or more components described herein, such as, but not limited to, channel selection component 190 (FIGS. 1 and 2). The bus 802 may also link various other circuits such as timing sources, peripherals, voltage regulators, and power management circuits. A bus interface 808 provides an interface between the bus 802 and a transceiver 810. The transceiver 810 provides a means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable medium 806. The software, when executed by the processor 804, causes the processing system 814 to perform the various functions described herein for any particular apparatus. The computer-readable medium 806 may also be used for storing data that is manipulated by the processor 804 when executing software.

Figure 9:
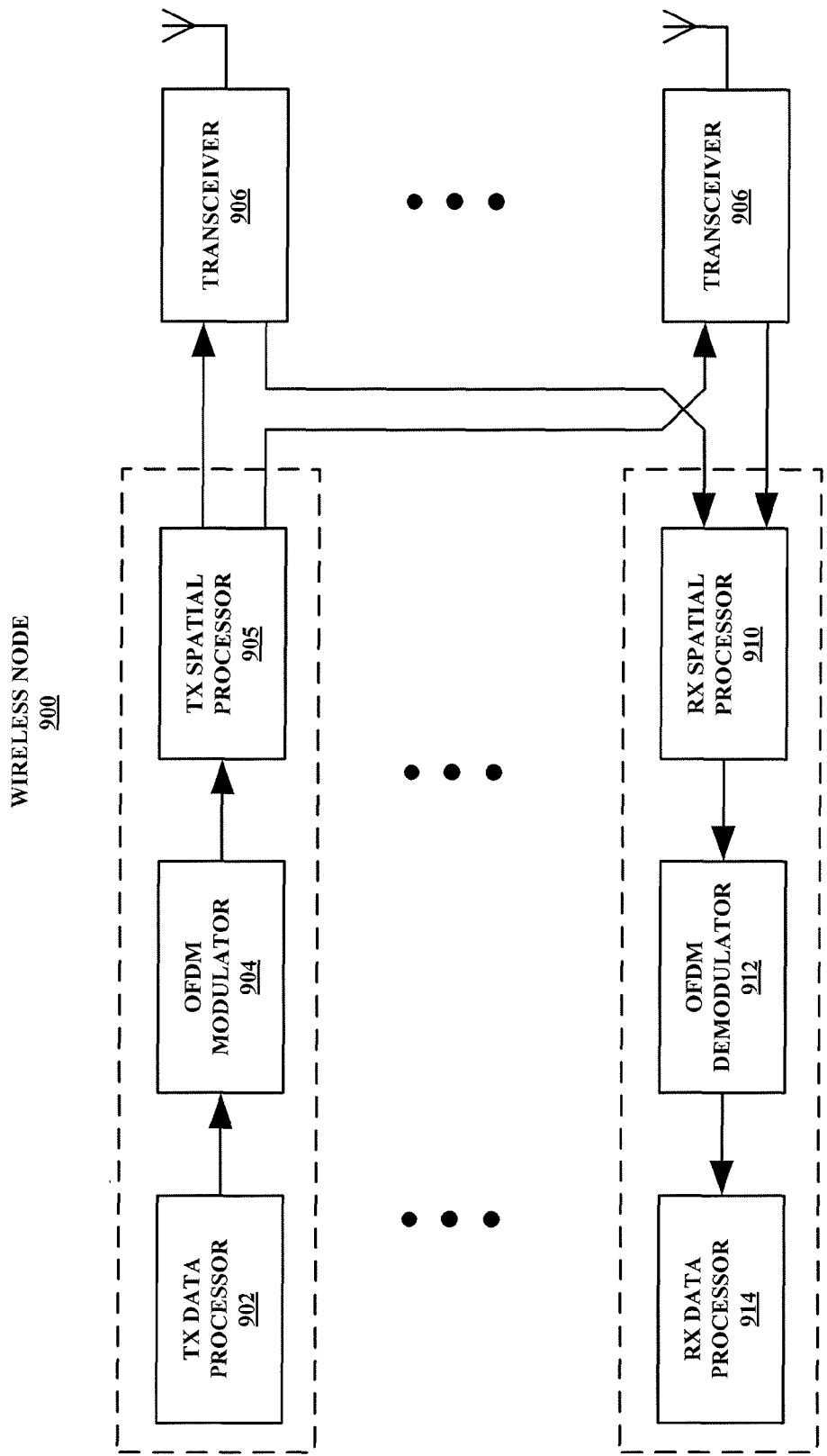
FIG. 9 is a wireless node that includes a front end processing system in a wireless node in the wireless communications network of FIG. 1, in accordance with an aspect of the present disclosure.

FIG. 9 is a conceptual block diagram illustrating an example of the signal processing functions of the physical (PHY) layer for an access point, e.g., access point 150 or 160, and including channel selection component 190. In a transmit mode, a TX data processor 902 may be used to receive data from the medium access control (MAC) layer and encode (e.g., Turbo code) the data to facilitate forward error correction (FEC) at the receiving node. The encoding process results in a sequence of code symbols that that may be blocked together and mapped to a signal constellation by the TX data processor 902 to produce a sequence of modulation symbols.

In wireless nodes implementing orthogonal frequency-division multiplexing (OFDM), the modulation symbols from the TX data processor 902 may be provided to an OFDM modulator 904. The OFDM modulator splits the modulation symbols into parallel streams. Each stream is then mapped to an OFDM sub-carrier and then combined together using an Inverse Fast Fourier Transform (IFFT) to produce a time domain OFDM stream.

A TX spatial processor 906 performs spatial processing on the OFDM stream. This may be accomplished by spatially precoding each OFDM and then providing each spatially precoded stream to a different antenna via a transceiver 906. Each transmitter 906 modulates an RF carrier with a respective precoded stream for transmission over the wireless channel.

In a receive mode, each transceiver 906 receives a signal through its respective antenna 910. Each transceiver 906 may be used to recover the information modulated onto an RF carrier and provide the information to a RX spatial processor 910. The RX spatial processor 910 performs spatial processing on the information to recover any spatial streams destined for the wireless node 900. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 900, they may be combined by the RX spatial processor 910.

In wireless nodes implementing OFDM, the stream (or combined stream) from the RX spatial processor 910 is provided to an OFDM demodulator 912. The OFDM demodulator 912 converts the stream (or combined stream) from time-domain to the frequency domain using a Fast Fourier Transform (FFT). The frequency domain signal comprises a separate stream for each sub-carrier of the OFDM signal. The OFDM demodulator 912 recovers the data (i.e., modulation symbols) carried on each subcarrier and multiplexes the data into a stream of modulation symbols.

A RX data processor 914 may be used to translate the modulation symbols back to the correct point in the signal constellation. Because of noise and other disturbances in the wireless channel, the modulation symbols may not correspond to an exact location of a point in the original signal constellation. The RX data processor 914 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 914 then uses the sequence of code symbol LLRs in order to decode the data that was originally transmitted before providing the data to the MAC layer.

Figure 10:
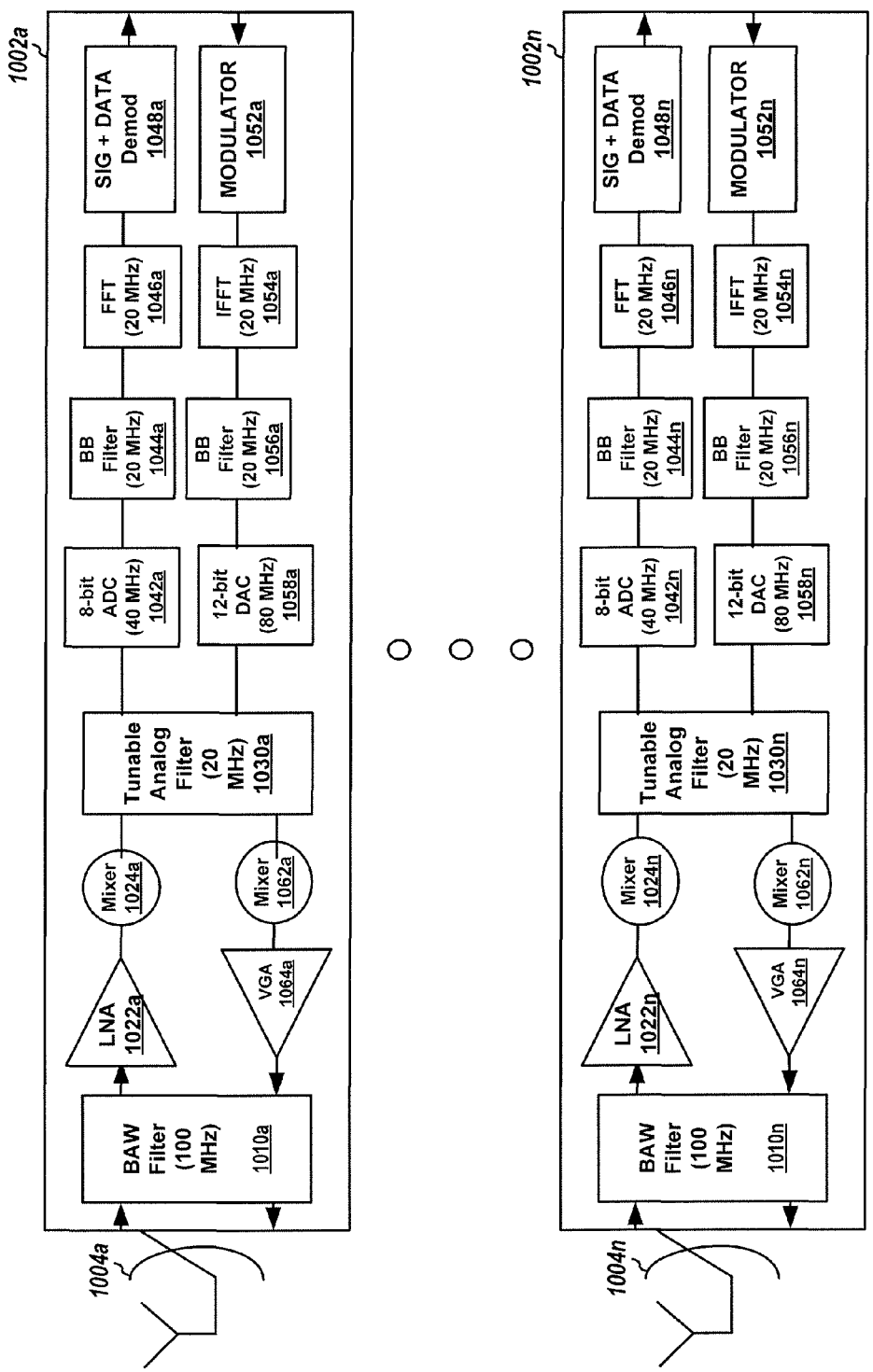
FIG. 10 is a block diagram illustrating an example of a hardware configuration for the front end processing system of FIG. 9, in accordance with an aspect of the present disclosure.

FIG. 10 is a conceptual block diagram illustrating an example of the signal processing functions of a front end architecture 1000 for an access point, e.g., access point 150 or 160, and including channel selection component 190, the architecture 1000 including a plurality of channel modules 1002a-n. The components of the channel module 1002a will be used to describe the function and operation of all the channel modules 1002a-1002n. As shown, the channel module 1002a includes a receive side and a transmit side.

On the receive side, a bulk acoustic wave (BAW) filter 1010a filters a signal received from an antenna 1004a. As each of the VHT channels requires isolation, each VHT channel may be provided by a separate antenna 1004a-n. In one aspect, each antenna 1004a-n is separated from each other by 2-10 lambda of spacing, or more depending on the physical configuration of the access point 150. This provides approximately 20 dB of isolation. In addition, the antennas 1004*a-n* may have different polarizations to provide further isolation between the antennas 1004*a-n*.

The filtered signal from the BAW filter 1010*a* is then provided to a low noise amplifier (LNA) 1022*a*. The LNA 1022*a* amplifies the signals captured by the antenna 1004*a* and filtered by the BAW filter 1010*a*. The LNA 1022*a* is placed at the front portion of the receive side of the front end architecture 1000 as the overall noise figure of the receive side is significantly affected by the first few stages of processing. Using the LNA 1022*a*, the noise of all subsequent stages of the receive side of the front end architecture 1000 is reduced by the gain of the LNA 1022*a*. However, any noise caused by the LNA 1022*a* will be injected directly into the received signal. Thus, it is preferable that the LNA 1022*a* to boost the desired signal power while adding as little noise and distortion as possible so that the retrieval of this signal is possible in the later stages in the system.

A mixer 1024*a* receives the signal from the LNA 1022*a*. The purpose of the mixer is to down-convert the RF signal to a IF or baseband signal, before sending it to a tunable analog filter 1010*a*. The tunable analog filter 1010*a* filters out unwanted signals and allows selected frequencies and signals to pass. The filter can be "tuned" to one or more adjacent 20 MHz channels to accommodate the VHT channel bandwidth. Each tunable analog filter 1110*a-n* may then be use to filter for a particular channel.

An analog-to-digital converter (ADC) 1142*a* receives the signal, filtered from tunable analog filter 1010*a*, and converts the analog signal to a digital signal. The ADC 1042*a* samples the analog signal with a sampling rate that is at least twice the bandwidth of the tunable analog filter 1010*a* with a sampling of 8-bits. The digital signal is then output to a digital baseband (BB) filter 1044*a*.

The BB filter 1044*a* filters the digital signal to extract the signal that is sent to a fast Fourier transform unit (FFT) 1046*a*. The FFT 1046*a* converts the signal from a time domain to a frequency domain, separating the signal into its magnitude and phase components, before sending it to a demodulator 1048*a*.

The demodulator 1048*a* will decode the signal to extract the data symbols (modulation symbols) to pass the stream of symbols for processing by a back end receiver data processor (not shown).

On the transmit side, a modulator 1052*a* processes a data stream to create a stream of modulated symbols for an inverse fast Fourier transform unit (IFFT) 1054*a*.

The IFFT 1054*a* transforms the sequence of modulation symbols to a time domain stream that is sent to a baseband (BB) filter 1056*a*.

The BB filter 1056*a* receives the time domain stream and provides further noise rejection to ensure that the images are at least 15 dB below noise floor.

The digital-to-analog converter (DAC) 1058*a* converts the digital signal, based on a 12-bit signal, into an analog signal to be sent to the tunable analog filter 1010*a*.

After the signal has been filtered and sent to a mixer 1062*a*, it is sent to a variable gain amplifier (VGA) 1064*a*. The VGA 1064*a* will provide a signal that is matched to the BAW filter 1010*a*.

The BAW filter 1010*a* then transmits the signal using the antenna 1004*a*. The BAW filter 1010*a* provides approximately 40 dB of isolation, and the tunable analog filter 1010*a* provides approximately 50 dB of isolation.

The following describe the worse case computations for the front end architecture. Assuming the modem is transmitting on a channel A at +20 dBm and receiving a packet on a channel B @ −90 dBm (~0 dB SNR). And, assuming an antenna isolation of 20 dB and a BAW filter rejection of 40 dB, the image A is @ −40 dBm, and the receiver packet on the channel B is @ −90 dBm. Then, the image power should be in the linear range of the LNA and the mixer, i.e., no harmonics or non-linearities are created. The tunable analog filter provides another 50 dB of rejection, leading the image A power to be @ −90 dBm. With a 1-bit ADC additional overhead (9-bit ADC), 3 such image channels may be accommodated. The digital BB filter provides another 15 dB of rejection to ensure that the images are at least 15 dB below noise floor.

Additional architectural considerations are as follows. VHT channel bandwidths of 20n MHz, can be supported, where n=1, 2, 3, 4. The adjustable ADC sampling rate may be 40n MHz. Adjustable analog digital filter bandwidth may be 20n MHz, and adjustable FFT/IFFT bandwidths may be 20n MHz. Furthermore, BB processing for all channels can be on the same chip to reduce area. Independent ADC and DAC per channel may be used. Although, the RF processing for all channels may be on the same chip to reduce area, the processing may be performed on separate chips to improve isolation. There may be a shared local oscillation across all channels.

Figure 11:
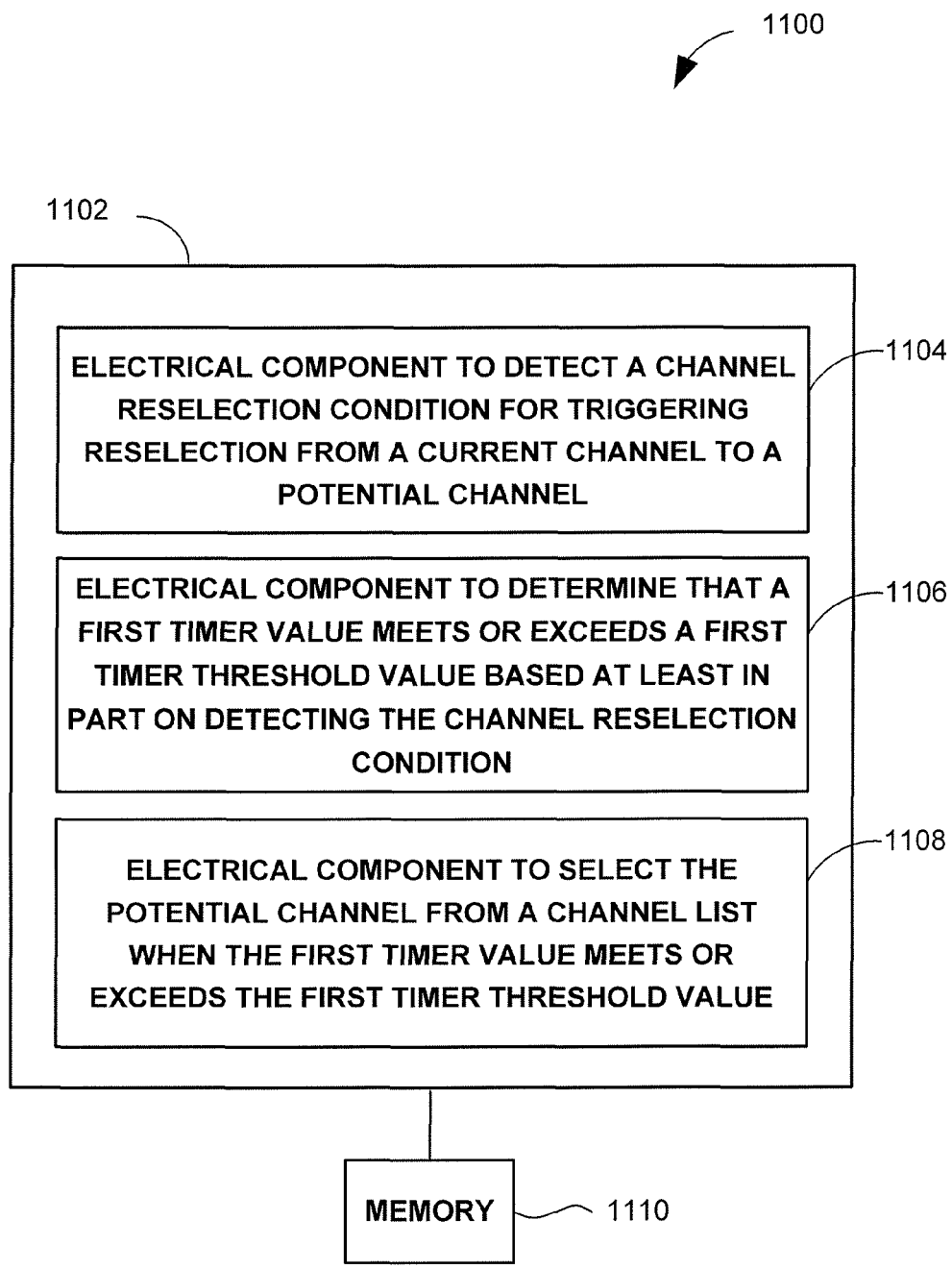
FIG. 11 illustrates an example block diagram of a logical grouping of electrical components in accordance with an aspect of the present disclosure, e.g., according to FIGS. 1 and 2.

Referring to FIG. 11, an example system 1100 for channel selection may operate according to the aspects of the channel selection component 190 (FIGS. 1 and 2) and the corresponding methods (FIGS. 3 and 4).

For example, system 1100 can reside at least partially within an access point, for example, access points 150 and/or 160 (FIG. 1) including channel selection component 190. It is to be appreciated that system 1100 is represented as including functional blocks, which can be functional blocks that represent functions implemented by a processor, software, or combination thereof (for example, firmware). System 1100 includes a logical grouping 1102 of electrical components that can act in conjunction. For instance, logical grouping 1102 may include an electrical component 1104 to detect a channel reselection condition for triggering reselection from a current channel to a potential channel. For example, in an aspect, electrical component 1104 may comprise channel selection component 190 (FIGS. 1 and 2).

Further, logical grouping 1102 may include an electrical component 1106 to determining that a first timer value meets or exceeds a first timer threshold value based at least in part on detecting the channel reselection condition. For example, in an aspect, electrical component 1106 may comprise channel selection component 190 (FIGS. 1 and 2).

Furthermore, logical grouping 1102 may include an electrical component 1108 to selecting the potential channel from a channel list when the first timer value meets or exceeds the first timer threshold value. For example, in an aspect, electrical component 1108 may comprise channel selection component 190 (FIGS. 1 and 2).

Additionally, system 1100 can include a memory 1112 that retains instructions for executing functions associated with the electrical components 1104, 1106, and/or 1108, stores data used or obtained by the electrical components 1104, 1106, and/or 1108, etc. While shown as being external to memory 1112, it is to be understood that one or more of the electrical components 1104, 1106, and/or 1108 can exist within memory 1112. In one example, electrical components 1104, 1106, and/or 1108 can comprise at least one processor, or each electrical component 1104, 1106, and/or 1108 can be a corresponding module of at least one processor. Moreover, in an additional or alternative example, electrical components 1104, 1106, and/or 1108 can be a computer program product including a computer readable medium, where each electrical component 1104, 1106, and/or 1108 can be corresponding code.

Figure 12:
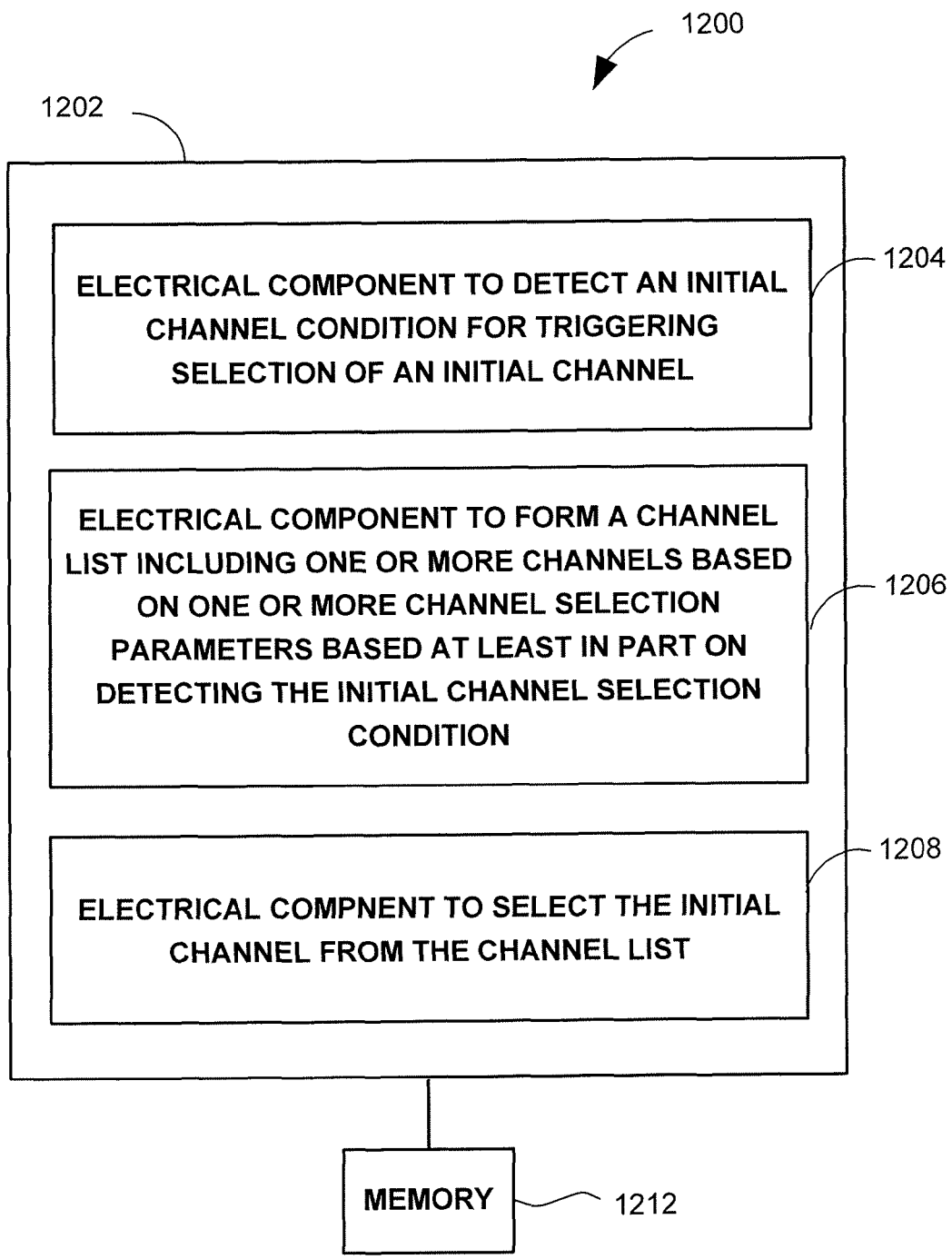
FIG. 12 illustrates an additional example block diagram of a logical grouping of electrical components in accordance with an aspect of the present disclosure, e.g., according to FIGS. 2 and 5; and In accordance with common practice, some of the drawings may be simplified for clarity. Thus, the drawings may not depict all of the components of a given apparatus (e.g., device) or method. Finally, like reference numerals may be used to denote like features throughout the specification and figures.

Referring to FIG. 12, an example system 1400 for channel selection may operate according to the aspects of the channel selection component 190 (FIGS. 1 and 2) and/or initial channel configuration component 240 (FIGS. 2 and 5) and the corresponding methods (FIG. 6).

For example, system 1200 can reside at least partially within an access point, access points 150 and/or 160 (FIG. 1) and/or channel selection component 190 (FIGS. 1 and 2) and/or initial channel configuration component 240 (FIGS. 2 and 5). It is to be appreciated that system 1200 is represented as including functional blocks, which can be functional blocks that represent functions implemented by a processor, software, or combination thereof (for example, firmware). System 1200 includes a logical grouping 1202 of electrical components that can act in conjunction.

For instance, logical grouping 1202 may include an electrical component 1204 to detect an initial channel selection condition for triggering selection of an initial channel. For example, in an aspect, electrical component 1204 may comprise channel selection component 190 (FIGS. 1 and 2) and/or initial channel configuration component 240 (FIGS. 2 and 5).

Additionally, logical grouping 1202 may include an electrical component 1206 to form a channel list including one or more channels based on one or more channel selection parameters based at least in part on detecting the initial channel selection condition. For example, in an aspect, electrical component 1206 may comprise channel selection component 190 (FIGS. 1 and 2) and/or initial channel configuration component 240 (FIGS. 2 and 5).

Further, logical grouping 1202 may include an electrical component 1208 to select the initial channel from the channel list. For example, in an aspect, electrical component 1208 may comprise channel selection component 190 (FIGS. 1 and 2) and/or initial channel configuration component 240 (FIGS. 2 and 5).

Additionally, system 1200 can include a memory 1212 that retains instructions for executing functions associated with the electrical components 1204, 1206, and/or 1208, stores data used or obtained by the electrical components 1204, 1206, and/or 1208, etc. While shown as being external to memory 1212, it is to be understood that one or more of the electrical components 1204, 1206, and/or 1208 can exist within memory 1212. In one example, electrical components 1204, 1206, and/or 1208 can comprise at least one processor, or each electrical component 1204, 1206, and/or 1208 can be a corresponding module of at least one processor. Moreover, in an additional or alternative example, electrical components 1204, 1206, and/or 1208 can be a computer program product including a computer readable medium, where each electrical component 1204, 1206, and/or 1208 can be corresponding code.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method of communication, comprising:
   detecting, at an access point, a channel reselection condition for triggering reselection from a current channel to a first potential channel;
   determining that a first timer value meets or exceeds a first timer threshold value based at least in part on detecting the channel reselection condition;
   selecting the first potential channel from a channel list when the first timer value meets or exceeds the first timer threshold value;
   determining whether a second timer value associated with the first potential channel meets or exceeds a second timer threshold value; and
   communicating with at least one access terminal over the current channel or the first potential channel based on the determining whether the second timer value associated with the first potential channel meets or exceeds the second timer threshold value.

2. The method of claim 1, wherein the second timer value comprises a time duration value between a previous selection of the first potential channel by the access point and a current selection of the first potential channel.

3. The method of claim 1, further comprising performing channel reselection to the first potential channel when the second timer value meets or exceeds the second timer threshold value.

4. The method of claim 1, further comprising selecting a second potential channel from the channel list when the second timer value does not meet or exceed the second timer threshold value, wherein the second potential channel corresponds to a subsequent most suitable available channel in the channel list.

5. The method of claim 1, wherein the first timer value comprises a time duration value between a selection of the current channel by the access point and the detection of the channel reselection condition.

6. The method of claim 1, wherein detecting the channel reselection condition comprises determining that a current channel quality value meets or is less than a first quality threshold value, wherein the current channel quality value corresponds to the current channel on which the access point is currently communicating.

7. The method of claim 6, wherein one or both of the current channel quality value and the first quality threshold value are based at least in part on one or more of a load level value, a traffic class indication, a quality of service (QoS) value, a received power indicator, a throughput value, an offered load value, a retransmission probability value, a channel busy time value, an interference level value, a spectral scan measurement value, an 802.11k measurement value, and the channel list.

8. The method of claim 1, wherein detecting the channel reselection condition comprises determining that a potential channel quality gain value associated with the first potential channel meets or exceeds a second quality threshold value, wherein one or both of the potential channel quality gain value and the second quality threshold value are determined based at least in part on utility criteria.

9. The method of claim 8, wherein the channel list comprises a list of one or more channels including the current channel and ranked according to the utility criteria, and wherein the first potential channel corresponds to a most suitable available channel in the channel list.

10. The method of claim 9, wherein the utility criteria comprise one or more of a received power indicator value, a noise level value, a channel available time value, an effective theoretical capacity value, an interference level value, a spectral scan value, and a 802.11 measurement value.

11. The method of claim 10, further comprising determining the effective theoretical capacity value as a function of one or more of a downlink power value, a number of access points, a number of access points communicating on the current channel, wherein the effective theoretical capacity indicates a maximum downlink capacity at the access point.

12. The method of claim 1, wherein the access point communicates according to a wireless local area network technology.

13. A non-transitory computer-readable medium storing computer executable instructions for communication, wherein the instructions are executable by a computer to:
   detect, at an access point, a channel reselection condition for triggering reselection from a current channel to a first potential channel;
   determine that a first timer value meets or exceeds a first timer threshold value based at least in part on detecting the channel reselection condition;
   select the first potential channel from a channel list when the first timer value meets or exceeds the first timer threshold value;
   determine whether a second timer value associated with the first potential channel meets or exceeds a second timer threshold value; and
   communicate with at least one access terminal over the current channel or the first potential channel based on the determining whether the second timer value associated with the first potential channel meets or exceeds the second timer threshold value.

14. An apparatus for communication, comprising:
   means for detecting, at an access point, a channel reselection condition for triggering reselection from a current channel to a first potential channel;
   means for determining that a first timer value meets or exceeds a first timer threshold value based at least in part on detecting the channel reselection condition;
   means for selecting the first potential channel from a channel list when the first timer value meets or exceeds the first timer threshold value;
   means for determining whether a second timer value associated with the first potential channel meets or exceeds a second timer threshold value; and
   means for communicating with at least one access terminal over the current channel or the first potential channel based on the determining whether the second timer value associated with the first potential channel meets or exceeds the second timer threshold value.

15. An apparatus for communication, comprising:
a memory storing executable instructions; and
a processor in communication with the memory, wherein the processor is configured to execute the instructions to:
  detect, at an access point, a channel reselection condition for triggering reselection from a current channel to a first potential channel;
  determine that a first timer value meets or exceeds a first timer threshold value based at least in part on detecting the channel reselection condition;
  select the first potential channel from a channel list when the first timer value meets or exceeds the first timer threshold value;
  determine whether a second timer value associated with the first potential channel meets or exceeds a second timer threshold value; and
  communicate with at least one access terminal over the current channel or the first potential channel based on the determining whether the second timer value associated with the first potential channel meets or exceeds the second timer threshold value.

16. The apparatus of claim 15, wherein the second timer value comprises a time duration value between a previous selection of the first potential channel by the access point and a current selection of the first potential channel.

17. The apparatus of claim 15, wherein the processor is further configured to execute the instructions to perform channel reselection to the first potential channel when the second timer value meets or exceeds the second timer threshold value.

18. The apparatus of claim 15, wherein the processor is further configured to execute the instructions to select a second potential channel from the channel list when the second timer value does not meet or exceed the second timer threshold value, wherein the second potential channel corresponds to a subsequent most suitable available channel in the channel list.

19. The apparatus of claim 15, wherein the first timer value comprises a time duration value between a selection of the current channel by the access point and the detection of the channel reselection condition.

20. The apparatus of claim 15, wherein to detect the channel reselection condition, wherein the processor is further configured to execute the instructions to determine that a current channel quality value meets or is less than a first quality threshold value, wherein the current channel quality value corresponds to the current channel on which the access point is currently communicating.

21. The apparatus of claim 20, wherein one or both of the current channel quality value and the first quality threshold value are based at least in part on one or more of a load level value, a traffic class indication, a quality of service (QoS) value, a received power indicator, a throughput value, an offered load value, a retransmission probability value, a channel busy time value, an interference level value, a spectral scan measurement value, an 802.11k measurement value, and the channel list.

22. The apparatus of claim 15, wherein to detect the channel reselection condition, wherein the processor is further configured to execute the instructions to determine that a potential channel quality gain value associated with the first potential channel meets or exceeds a second quality threshold value, wherein one or both of the potential channel quality gain value and the second quality threshold value are determined based at least in part on utility criteria.

23. The apparatus of claim 22, wherein the channel list comprises a list of one or more channels including the current channel and ranked according to the utility criteria, and wherein the first potential channel corresponds to a most suitable available channel in the channel list.

24. The apparatus of claim 23, wherein the utility criteria comprise one or more of a received power indicator value, a noise level value, a channel available time value, an effective theoretical capacity value, an interference level value, a spectral scan value, and a 802.11 measurement value.

25. The apparatus of claim 24, wherein the processor is further configured to execute the instructions to determine the effective theoretical capacity value as a function of one or more of a downlink power value, a number of access points, a number of access points communicating on the current channel, wherein the effective theoretical capacity indicates a maximum downlink capacity at the access point.

26. The apparatus of claim 15, wherein the access point communicates according to a wireless local area network technology.

* * * * *